(12) United States Patent
Warner (10) Patent No.: US 10,677,412 B2
(45) Date of Patent: Jun. 9, 2020

(54) VEHICLE LIGHT BAR COVER

(71) Applicant: Gabe Warner, Hillsboro, MO (US)

(72) Inventor: Gabe Warner, Hillsboro, MO (US)

(*) Notice: Subject to any disclaimer, the term of this patent is extended or adjusted under 35 U.S.C. 154(b) by 213 days.

(21) Appl. No.: 15/904,121

(22) Filed: Feb. 23, 2018

(65) Prior Publication Data

US 2018/0238515 A1    Aug. 23, 2018

Related U.S. Application Data

(60) Provisional application No. 62/462,774, filed on Feb. 23, 2017.

(51) Int. Cl.
| | |
|---|---|
| *F21S 8/00* | (2006.01) |
| *B60Q 1/04* | (2006.01) |
| *B60Q 1/18* | (2006.01) |
| *F21S 45/10* | (2018.01) |
| *B60Q 1/00* | (2006.01) |
| *F21S 41/141* | (2018.01) |
| *B62D 35/00* | (2006.01) |

(52) U.S. Cl.
CPC ............ *F21S 45/10* (2018.01); *B60Q 1/0005* (2013.01); *B60Q 1/18* (2013.01); *B60Q 1/0483* (2013.01); *B60Q 2900/10* (2013.01); *B62D 35/00* (2013.01); *F21S 41/141* (2018.01)

(58) Field of Classification Search
CPC ...... F21S 45/10; F21S 41/141; B60Q 1/0005; B60Q 1/0483; B60Q 1/18
See application file for complete search history.

(56) References Cited

U.S. PATENT DOCUMENTS

| | | | | |
|---|---|---|---|---|
| 2014/0362574 A1* | 12/2014 | Barrett | ...................... | F21S 2/00 |
| | | | | 362/249.03 |
| 2015/0338062 A1* | 11/2015 | Lee | ........................... | F21K 9/60 |
| | | | | 362/293 |
| 2016/0161094 A1* | 6/2016 | Oh | ....................... | B60Q 1/2611 |
| | | | | 362/324 |

* cited by examiner

*Primary Examiner* — Karabi Guharay
(74) *Attorney, Agent, or Firm* — Michael L. Greenberg, Esq.; Greenberg & Lieberman, LLC (57) ABSTRACT

A cover for a light bar or similar horizontal lamp for vehicles is described. The cover apparatus is equipped with a rear cover portion and a front cover portion. The front cover portion consists of a cover panel configured to pivot to encompass the light within the apparatus, and to be opened at the will of the user to uncover the light bar. The rear half is equipped with one or more heat dissipation vents which conform to standard heat sinks found on conventional horizontal light bars for vehicles. The shape of the apparatus is aerodynamic such that it eliminates audible vibrations known to cause uncovered light bars to 'whistle' or otherwise emit an unwanted noise when the vehicle is underway. A version with a stationary, translucent front cover portion is preferred, and is fashioned of a single piece of flexible plastic.

8 Claims, 8 Drawing Sheets

VEHICLE LIGHT BAR COVER

CONTINUITY

This application is a non-provisional application of provisional patent application No. 62/462,774, filed on Feb. 23, 2017, and priority is claimed thereto.

FIELD OF THE PRESENT INVENTION

The present invention relates to a cover apparatus for a vehicle light bar, and more specifically relates to a sound-dampening and wind protection cover for a horizontal light bar configured to be installed on the front of motor vehicles.

BACKGROUND OF THE PRESENT INVENTION

Conventional personal vehicles such as cars, trucks, and vans are equipped with headlights to illuminate the road and driving conditions while driving in the dark or in low light conditions. Vehicles configured for use away from streetlights of towns and cities are often equipped with additional headlights including fog lamps and high-beam headlights. However, many vehicle owners find that these factory-installed lighting options do not provide enough light for driving in extreme dark conditions, such as those found when off-roading, driving in the backcountry, or while setting up camp in the wilderness.

As such, many vehicle owners opt to purchase aftermarket lighting accessories to provide additional lighting while driving, or when parked. These lights are often very bright, and may be angled to suit the needs of the owner. A wide variety of lights for such uses are presently available on the market in a variety of sizes, shapes, and colors. One of the most popular forms of aftermarket lighting of modern vehicles is that of the horizontal LED light bar, which is positioned on the front of the vehicle, and is configured to cast bright light ahead of the vehicle from a multitude of LED bulbs.

Light bars such as these offer great functionality, and cause little drain on the battery of the vehicle, making them a popular choice among truck, Jeep™, Land Rover™, and other popular off-roading vehicles. They are easy to install by the owner in most cases, and provide ample lighting for most needs. It is expected that some vehicle manufacturers will begin integrating horizontal LED light bars into vehicles as a stock option.

Unfortunately, most horizontal LED light bars on the market cause drag on the vehicle via wind resistance. Even worse, the wind resistance is known to cause an audible 'whistle' noise when the vehicle is traveling. Presently, few solutions are available to the owner to eliminate this sound, which is caused when air is rushed over the heat dissipation coils or heat sink of the light bar. The wind resistance caused by the lack of aerodynamic design in conventional LED light bars can also negatively impact the fuel economy of the vehicle. Additionally, LED light bars presently on the market are rarely equipped with a light cover, which prevents bugs and other debris from collecting on the lights of the light bar. Light covers on the market fail to provide an aerodynamic design to minimize wind resistance.

If there were a cover for aftermarket LED light bars that could solve the audible 'whistle' noise while providing an aerodynamic design to the light bar, owners of vehicles equipped with LED light bars could have a more peaceful riding experience while still enjoying the benefits of a horizontal light bar.

Thus, there is a need for a light bar cover equipped with an aerodynamic design, which is configured to prevent the 'whistle' sound caused by air passing through and around the light bar. Such a device is preferably equipped with a hinge or hinge-like mechanism by which the front portion of the light bar cover may pivot so that the lights of the light bar may be exposed to illuminate the space ahead of the vehicle. Alternate embodiments are ideally configured with a uni-body styled frame, which need not be opened for light to be emitted through the cover.

Light bar covers found in the prior art all fail to provide an aerodynamically neutral shape to facilitate the reduction and/or elimination of noise caused by air movement over the light bar. As such, they fail to adequately reduce the sound caused by wind. Additionally, light bar covers presently on the market have mechanical parts, such as hinges, which is unlike the present invention, and are installed differently than that of the present invention. Many light bar covers also fail to encompass the entirety of the light bar fixture, and instead, serve to only cover the front of the light bar, unlike the present invention.

SUMMARY OF THE PRESENT INVENTION

The present invention is a cover apparatus for a light bar of a vehicle. The cover is configured to encompass the front and rear of the light bar, and afford the light bar an aerodynamic shape. As such, when the present invention is installed and the cover is closed, a shape similar to that of an airplane wing is formed by the cover and light bar assembly. The cover apparatus of the present invention is composed of a cover flap portion and a cover base portion. The cover base portion is configured to extend around the rear of the light bar. The cover flap portion is configured to cover the front of the light bar. The cover flap portion is preferably rounded, which converts the planar face of the light bar to that of a rounded front, greatly reducing wind drag by its neutral airfoil aerodynamic design.

The cover flap portion is preferably equipped with one or more Velcro™ securing straps, which function to secure the cover flap portion to the cover base portion. As such, the Velcro may be used to maintain the cover flap portion in an 'open' state, providing for light to be emitted from the light bar freely. Conversely, the Velcro may also be used to secure the cover flap portion of the present invention down, such that the entirety of the front of the light bar is covered by the present invention. As such, the Velcro securing straps are preferably equipped with Velcro on both the top and bottom of each securing strap.

The present invention is preferably made of a lightweight material, such as polycarbonate plastic or vinyl. A textured or fabric shell may be present on the exterior of the present invention as well. The material of the present invention is designed to withstand wind, mild heat, and UV radiation without deterioration. It is envisioned that some or all of the front portion of the cover of the present invention may be clear, or light-permeable such that the light may function while the cover is closed, as well as when open. A logo, name, or other text may be disposed on the front cover portion of the apparatus, which may then be illuminated when the light bar is activated while the cover is closed.

Similarly, a tint or colorized lens may be present as a slide-in layer which may be changed (added or removed) at will by the user manually.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
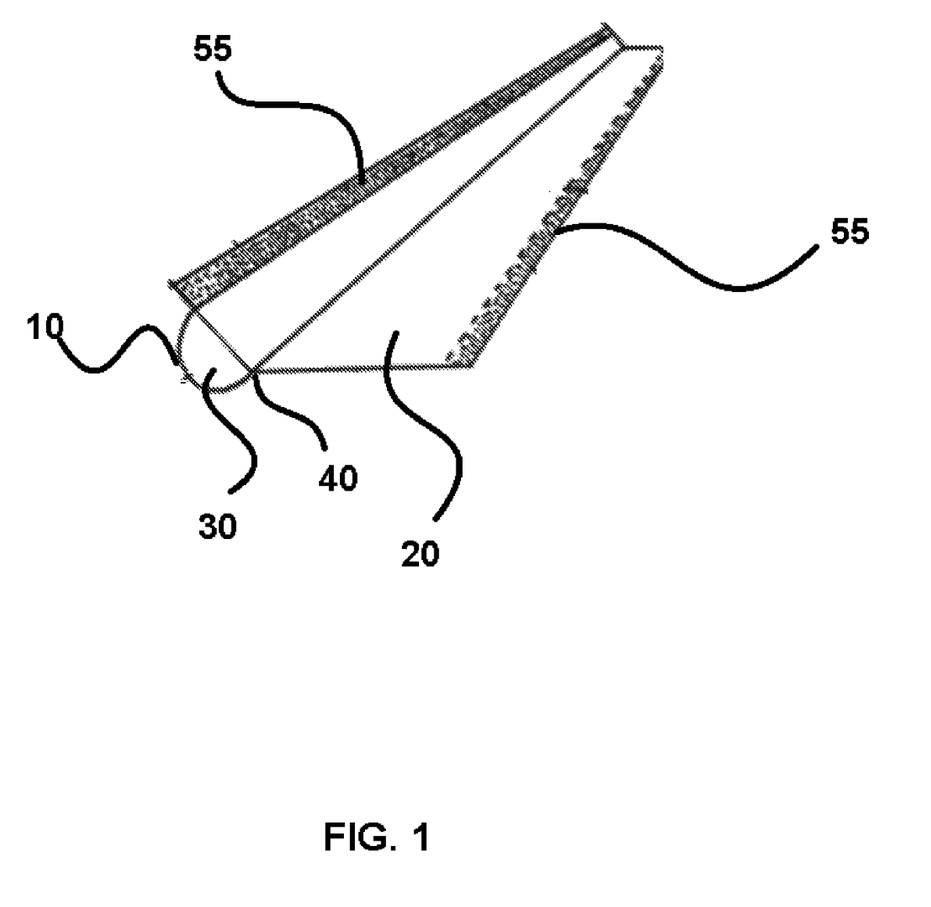
FIG. 1 exhibits a perspective view of the present invention as seen from the side and front while open, prior to installation.

The present invention is a cover apparatus configured to completely cover the front and rear of a light bar for a vehicle. There three embodiments of the present invention. The first embodiment of the apparatus is equipped with a cover flap portion (10) and a rear cover portion (20), as seen in FIG. 1. The cover flap portion (10) is disposed at the front of the apparatus, and is configured to conceal the LED lights of the light bar of the vehicle. The rear cover portion (20) is configured to wrap around the rear of the light bar. Additionally, the cover flap portion (10) is equipped with padding (30) disposed in communication with the cover flap portion (10), which serves as a structural foundation for the overall aerodynamic shape of the present invention. When closed, the present invention exhibits a neutral airfoil design, similar to the shape of a wing of an aircraft (without a degree of lift), in order to minimize wind resistance and noise during travel.

The cover flap portion (10) is preferably connected to the rear cover portion (20) at a bottom (40) of the apparatus in some embodiments. Additionally, the present invention employs at least one horizontal Velcro™ securing strap (55), (or similar hook-and-loop fastener) which is configured to secure the cover flap portion (10) in place against the light bar when the apparatus is in the closed ('covered') position. The horizontal Velcro securing strap (55) preferably runs the entire length of both the cover flap portion (10) and rear cover portion (20) of the present invention, as shown in FIG. 1.

Velcro is preferably used in the preferred embodiment of the present invention as opposed to other securing elements because it holds up to the elements during off-road use, and provides a scratch-free option when the present invention is installed near painted surfaces of the vehicle.

When the cover of this embodiment of the present invention opens, the flex point of the cover flap portion (10) is disposed at the halfway point of the front radius of the light bar. The end plate of the present invention is welded into position from the top of the radius to the halfway point of the light bar. This allows the cover flap portion (10) to flex past the other half of the radius down past the edge of the end plate. There is preferably a sufficient size allowance which overlaps the bottom of the present invention to allow for installation of the present invention on larger-faced light bars. Sizing in this manner provides for the face of the light bar to be completely enclosed by the present invention so that no light can be emitted.

Installation of the first embodiment of the present invention to the light bar of a vehicle is preferably as follows:

1. First, the user places the cover flap portion (10) against the front face of the light bar.

2. Next, the user wraps the rear cover portion (20) around the bottom of the light bar until a portion of the rear cover portion (20) is atop the light bar with the horizontal Velcro securing strap (55) facing upwards.

3. The user then connects the horizontal Velcro securing strap (55) of the cover flap portion (10) to the horizontal Velcro securing strap (55) of the rear cover portion (20) while pulling the rear cover portion (20) to be tight around the light bar.

4. The user then adjusts and tightens the Velcro connection of the horizontal Velcro securing straps (55) as needed to ensure that the present invention is tightly wrapped around the light bar.

Figure 2:
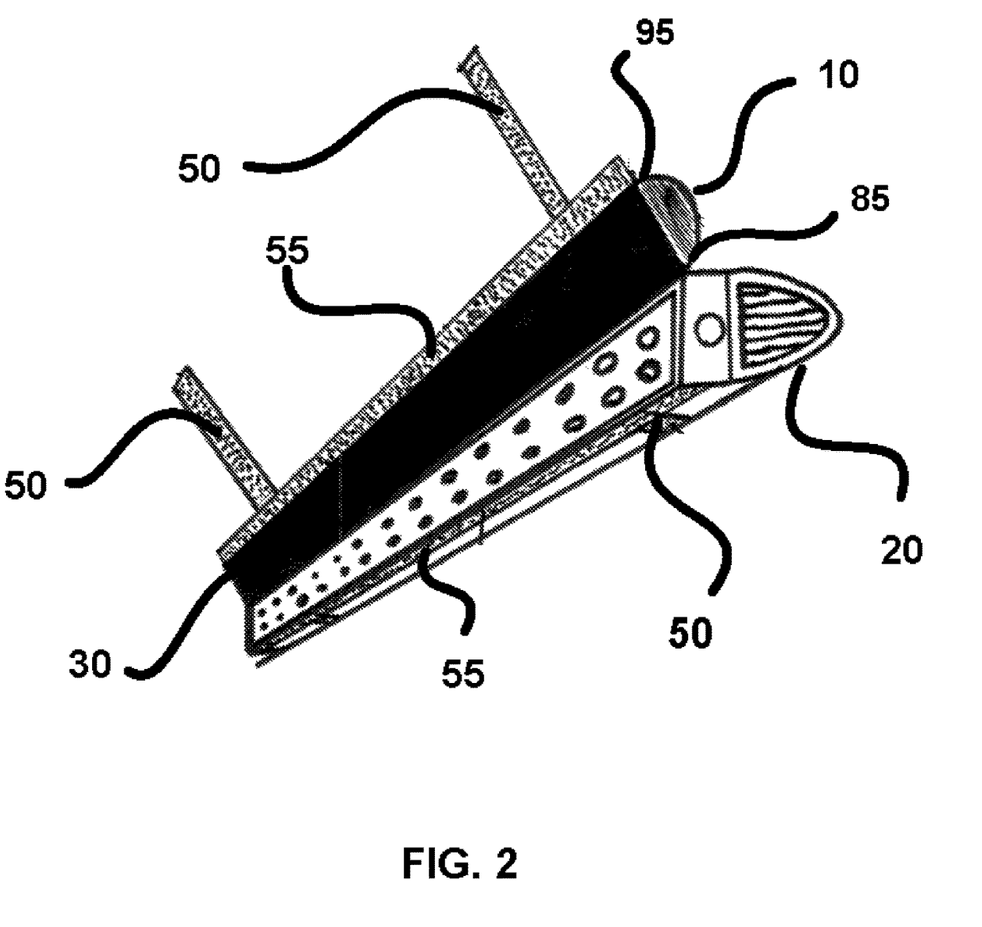
FIG. 2 displays a view a second embodiment of the present invention as seen from the front.

A second embodiment of the present invention, as shown in FIG. 2, is also made of vinyl or a vinyl-based material. This embodiment is similar to the first embodiment, in that it is configured to wrap around the rear of the light bar, and employs padding (30) to maintain the neutral airfoil aerodynamic shape of the present invention. In addition to the horizontal Velcro securing strap (55), this second embodiment also employs one or more vertical Velcro securing straps (50), which facilitate both mounting of the present invention to the light bar, as well as to secure the cover flap portion (10) up and away from the front of the light bar when use of the light bar is needed. As such, the second embodiment of the present invention does not require the complete removal of the present invention for light bar operation. The second embodiment is preferably equipped with an L-shaped channel frame, which is used to maintain the rear cover portion (20) in position around the rear of the light bar. The L-shaped channel frame is preferably sewn into the rear cover portion (20), and connects to the light bar via tension.

As shown in FIG. 2, the cover flap portion (10) is curved, and is approximately a half-circle. At the top and bottom edges of the cover flap portion (10), shown as top edge (85) and bottom edge (95), the L-shaped channel frame is preferably disposed, giving the present invention structural strength. It should be understood that the L-shaped channel is housed within a sealed pocket of the vinyl.

The horizontal Velcro securing strap (55) of the cover flap portion (10) is configured to overlap with the horizontal Velcro securing strap (55) of the rear cover portion (20) for proper installation. The vertical Velcro securing strap(s) (50) are preferably double sided with Velcro in order to hold the cover flap portion (10) open or closed by wrapping around the light bar forwards or backwards. Strapping the cover flap portion (10) backwards secures the cover flap portion (10) in the open position when the light of the light bar is illuminated. Strapping the cover flap portion (10) forward closes the cover when the light of the light bar is not in use.

In short, the at least one Velcro securing strap (50) is preferably configured to secure the cover flap portion (10) against the rear cover portion (20) when the apparatus is open. As such, the at least one Velcro securing strap (50) is preferably equipped with Velcro on both sides of the at least one Velcro securing strap (50) of the present invention to facilitate securing the cover flap portion (10) to the rear cover portion (20) when the cover is opened, or when it is closed.

Installation for the second embodiment of the present invention is preferably as follows:

1. With the cover flap portion (10) positioned at the back top of the light bar, the user grasps the rigid frame channels of the L-shaped channel frame in each hand and, from the back of the fixture, the user pulls the present invention over the back of the fixture until both "L" channels are over the front top and bottom edges of the face of the light bar.
2. Then, the user secures the three Velcro straps that hold the "L" channels in position. One on the left edge, one on the right edge and one clear strap in the middle.
3. At this point the frame of the cover is installed.
4. The front radius should be able to hinge at the top of the light bar if step one was followed correctly.
5. The radius flap can now be hinged down over the light. It can be secured in that position when light is not in use by connecting the horizontal Velcro to bottom frame of light bar cover.
6. Secure long perpendicular Velcro straps around the underneath part of the light bar and continue to wrap around the light until secure.
7. To open the light cover for use of the light bar, the user performs step 6 in reverse and secures the cover flap portion (10) such that it is open via the vertical Velcro securing straps (50).

Per some state statues, one version of this third embodiment may be equipped with an opaque front cover portion (10), which does require removal in order to use the light bar. Clamping indentations (25) are disposed on the end caps (60) of the embodiment, which facilitate secure installation of the present invention to the light bar as shown in FIG. 3.

The front cover portion (10) of the front of the second embodiment of the apparatus is preferably designed such that the light bar may be illuminated while the cover flap portion (10) is in the closed position. When the front cover portion (10) is fixed in position and secured, and the light bar is illuminated, light may pass through the front cover portion (10), and may equipped with optics configured to focus the beams of light from the LED light bar. As such, some embodiments of the present invention may be customized with logos, names, or other text or artwork disposed on the front of the front cover portion (10) which is configured to illuminate when the light bar is activated. The use of optics may enhance the utility of less expensive LED light bars, which may not be equipped with as many LED bulbs as more expensive models.

Figure 3:
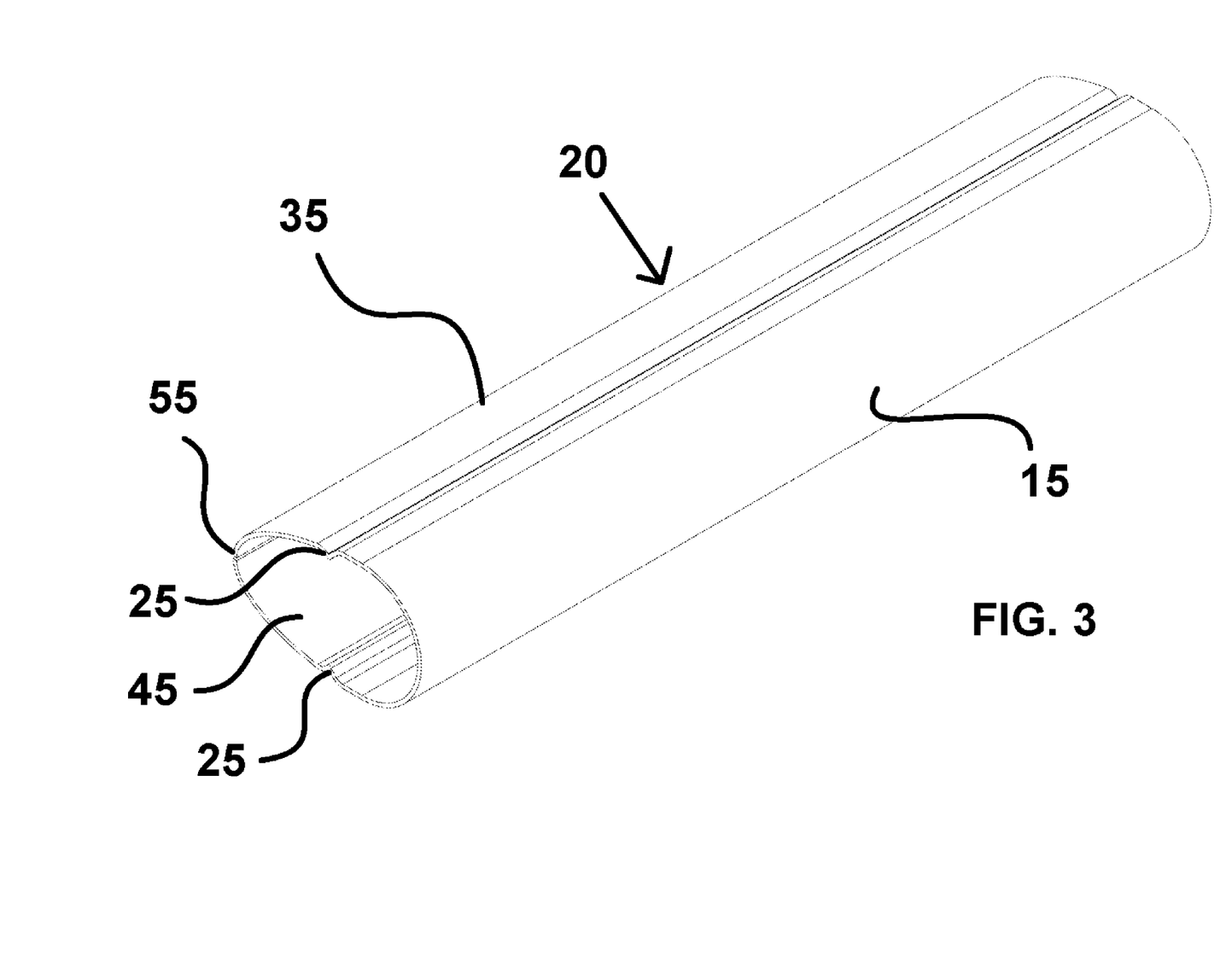
FIG. 3 shows a perspective view of a third (preferred) embodiment of the present invention, composed of a polycarbonate plastic.
Figure 4:
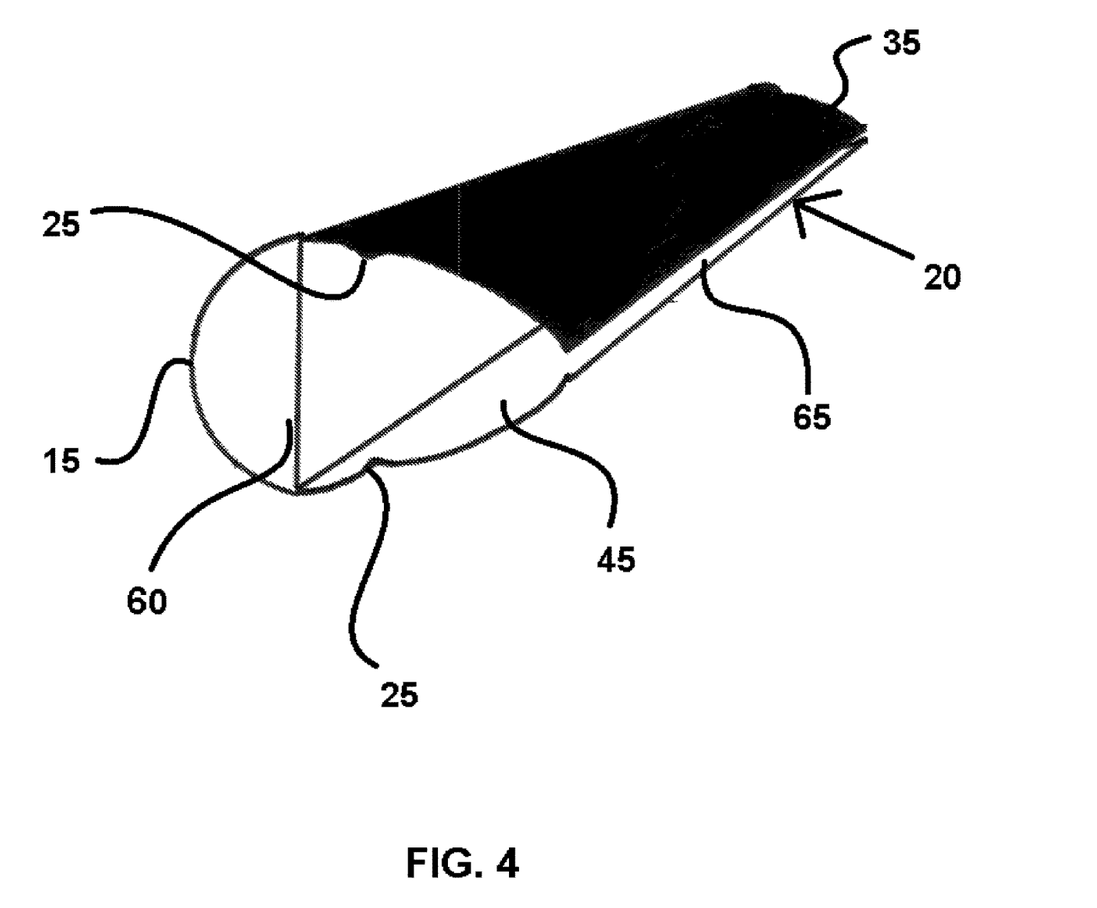
FIG. 4 exhibits a view of third (preferred) embodiment of the present invention, as seen from the front and side.
Figure 5:
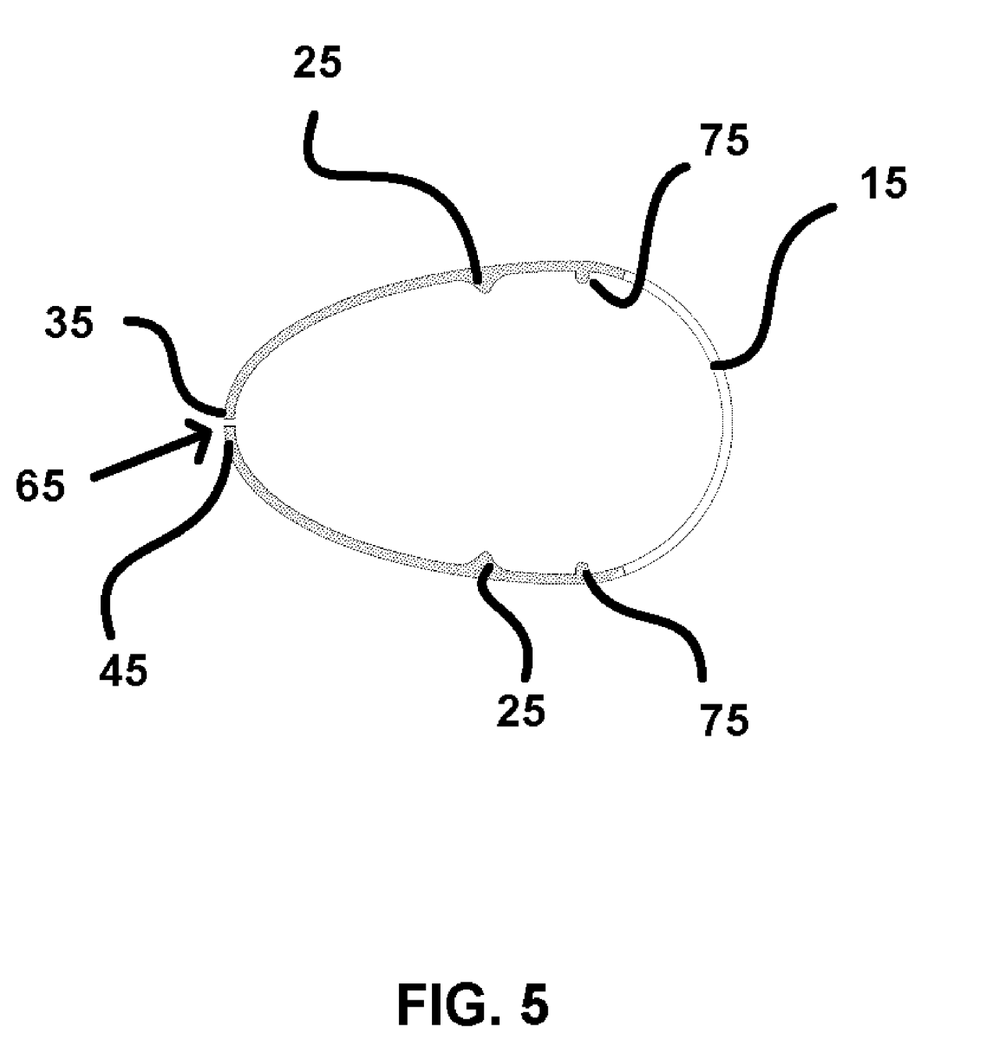
FIG. 5 depicts a side profile view of the third embodiment of the present invention.

A third (and primary) embodiment of the present invention is preferably composed of a polycarbonate plastic, as shown in FIGS. 3-5. This alternate embodiment is equipped with a stationary front cover portion (15), and a rear cover portion (20). Each is molded of a semi-flexible plastic, and is configured to snap into position around the light bar, and remain in position before, during, and after use. As such, the stationary front cover portion (15) is preferably transparent, or if tinted, translucent. Additionally, the stationary front cover (15) is preferably permanently affixed to the rear cover portion (20), as it is manufactured as a single molded piece of polycarbonate plastic or similar moldable durable material.

Installation for the third primary embodiment of the present invention is preferably as follows:

1. The user grasps the two flaps (top flap (35) and bottom flap (45), separated by gap (65) of the rear cover portion (20) and spreads them open such that they are slightly apart.
2. The user slides the rear cover portion (20) over the front face of the light bar.
3. The user continues to press the rear cover portion (20) of the cover along the length of the light bar until the flaps of the cover are over the rear of the light bar.
4. Then, the user pushes the cover onto the light bar until the face of the light bar is all the way up against the flat rib behind the radius front, until the stationary front cover portion (15) is against the face of the light bar.
5. The cover of the present invention is now in position, surrounding the light bar.

Figure 7:
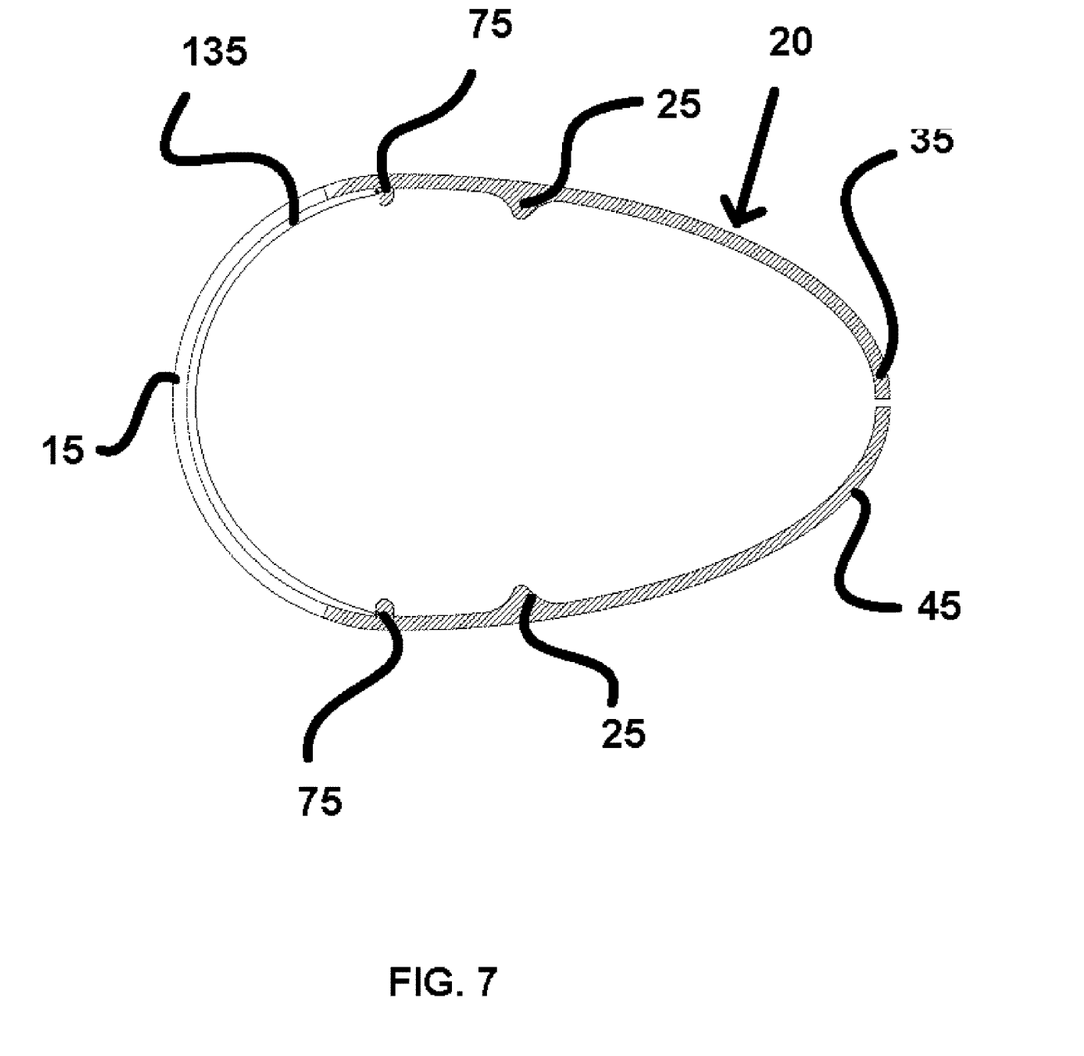
FIG. 7 shows a side profile view of the third (primary) embodiment of the present invention, detailing a slide-in film layer disposed behind the stationary front cover portion of the apparatus.

This third embodiment of the present invention is intended to be installed by opening the back and spreading the back flaps to substantial size to allow the cover to be placed over the face of the fixture. The cover is pushed on by the user until the face of the cover reaches a flat rib of the light bar or beginning radius of the light bar. Clamping indentations (25), as shown in FIG. 7, are used to serve as a mounting point via tension against the light bar itself, helping to maintain the present invention in position. At this point, the top flap (35) and bottom flap (45) have flexed back to their original form, creating a clamping point between the indentions shown in FIG. 3 and FIG. 4. This version is intended to be used when the light bar is on or off. Special features of this embodiment for use when light is on include, but are not limited to: a clear lens of the stationary front cover portion (15), a colored transparent lens of the stationary front cover portion (15), etched logos on the of the stationary front cover portion (15), and/or lettering disposed on the stationary front cover portion (15), allowing back lit options. This embodiment of the light cover of the present invention is intended to be removed when using a blacked out non-transparent cover when turning the light on for use.

The third embodiment of the present invention is preferably made of a polycarbonate plastic material, which is employed because it is unbreakable, UV resistant, and slightly flexible to prevent breaking during use or when under wind duress. It is known that such polycarbonate plastics can maintain shape even under extreme stress. The sides of the light bar are preferably left open, facilitating heat dissipation during use of the present invention. Some embodiments of the present invention are equipped with end caps (60), which are preferably welded into position via a molecular bonding agent, which functions to melt the plastic together securely. It is envisioned that the end caps (60) enable the end user to customize the appearance of the ends of the light bar, providing for custom features including different colors, transparent lettering, and logos.

Additional alternate embodiments of the present invention may be equipped with additional features to enhance the reliability and output of the LED light bar. For example, some embodiments of the present invention may be equipped with a light-focusing lens which is integrated within or acts as the front cover portion (15). Such a light-focusing lens effectively focuses and inherently brightens the apparent output of the LED light bar by focusing the emitted light.

Additionally, some embodiments of the present invention may be curved, so as to facilitate installation of the present invention on curved LED light bars. In such embodiments, both the front cover portion (15) and rear cover portion (20) are curved, creating a uni-body curved cover for both the front and rear of the LED light bar when installed. Other alternate embodiments of the present invention may be equipped with a wind-redirection panel, configured to redirect air up and above the present invention, further preventing any audible wind noise. Such a wind-redirection panel is similar to that of a wind panel on the top of a cab of a tractor-trailer rig, which curtails a portion of the wind resistance the rig experiences against the trailer during movement.

It should be noted that the present invention preferably does not employ hinges in any embodiment of the present invention. In embodiments configured to open via the cover flap portion (10), Velcro and/or vinyl materials are used to facilitate the secure opening and closing of the present invention.

An additional alternate embodiment of the present invention features a vinyl rear cover portion (20) and a plastic or acrylic front cover portion (15). In such an embodiment, the front cover portion (15) may be tinted and/or equipped with a lens (integrated optics) to focus the light of the LED light bar. Such an embodiment may be preferable in some installations, as the vinyl rear cover portion (20) can more easily bend to cover the rear portion of the LED light bar, facilitating rapid and seamless installation of the present invention. Such an embodiment is capable of maintaining shape better than embodiments solely made from vinyl. This embodiment is similar to a jacket cover for the LED light bar per the vinyl rear cover portion (20), with a clear or tinted front cover portion (15) made of polycarbonate plastic.

Additional features may be present on the front cover portion (15) of the present invention, which facilitate a change of the transparency of the front cover portion (15) electronically. As such, embodiments may be equipped with an electronic tint feature, provided via a film (135) disposed on or within the front cover portion (15), which enables a user to change the gradient/transparency of the front cover portion (15) at will via a switch or mobile device. In such embodiments, a Bluetooth or other wireless transmitter is preferably disposed in communication with the present invention, which is capable of interfacing with a wireless receiver of a mobile device, such as a smartphone or tablet computer. A proprietary mobile device application preferably facilitates the interface, and enables the user to select the transparency gradient via the screen of the mobile device. Such embodiments facilitate 'blacking-out' the light bar such that it is legal when not in use, and deactivating the opaque tint to enable use of the light bar.

In other embodiments of the present invention the film (135) is preferably a translucent sheet, and may be tinted, colored, or be equipped with text/logos which may not be changed electronically. In these embodiments, the film (135) may be manually slid into the stationary front cover portion (15) of the apparatus, as shown in FIG. 7. When installed, the film (135) is held in position via notches (75) disposed within the stationary front cover portion (15), which help to ensure that the film (135) does not fall out, and remains in the correct, semi-curved shape as shown in FIG. 7.

Figure 6:
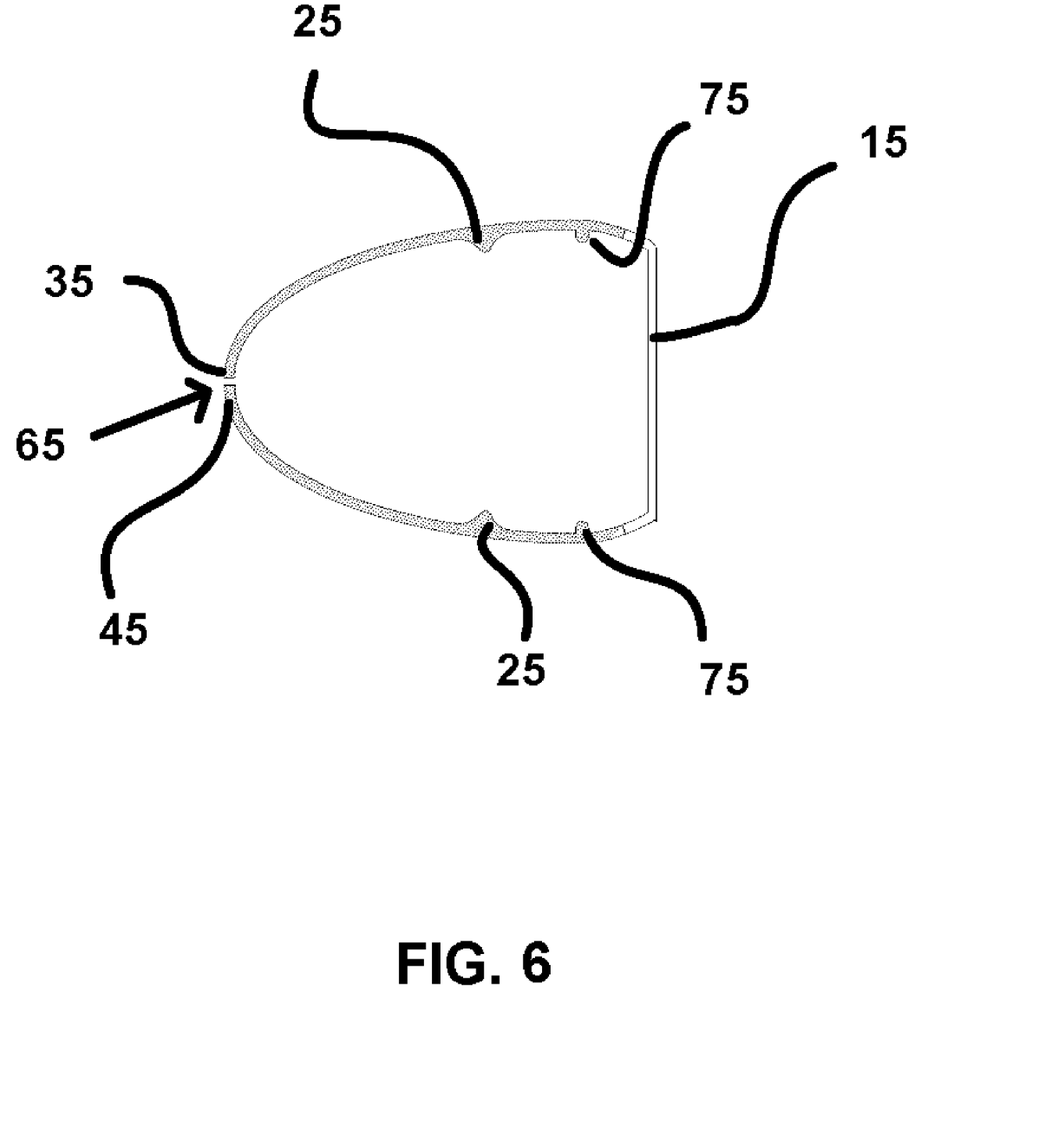
FIG. 6 shows an alternate embodiment of the present invention having a flat front, which is configured to conform directly to the front of the flat face of the light bar after installation.
Figure 8:
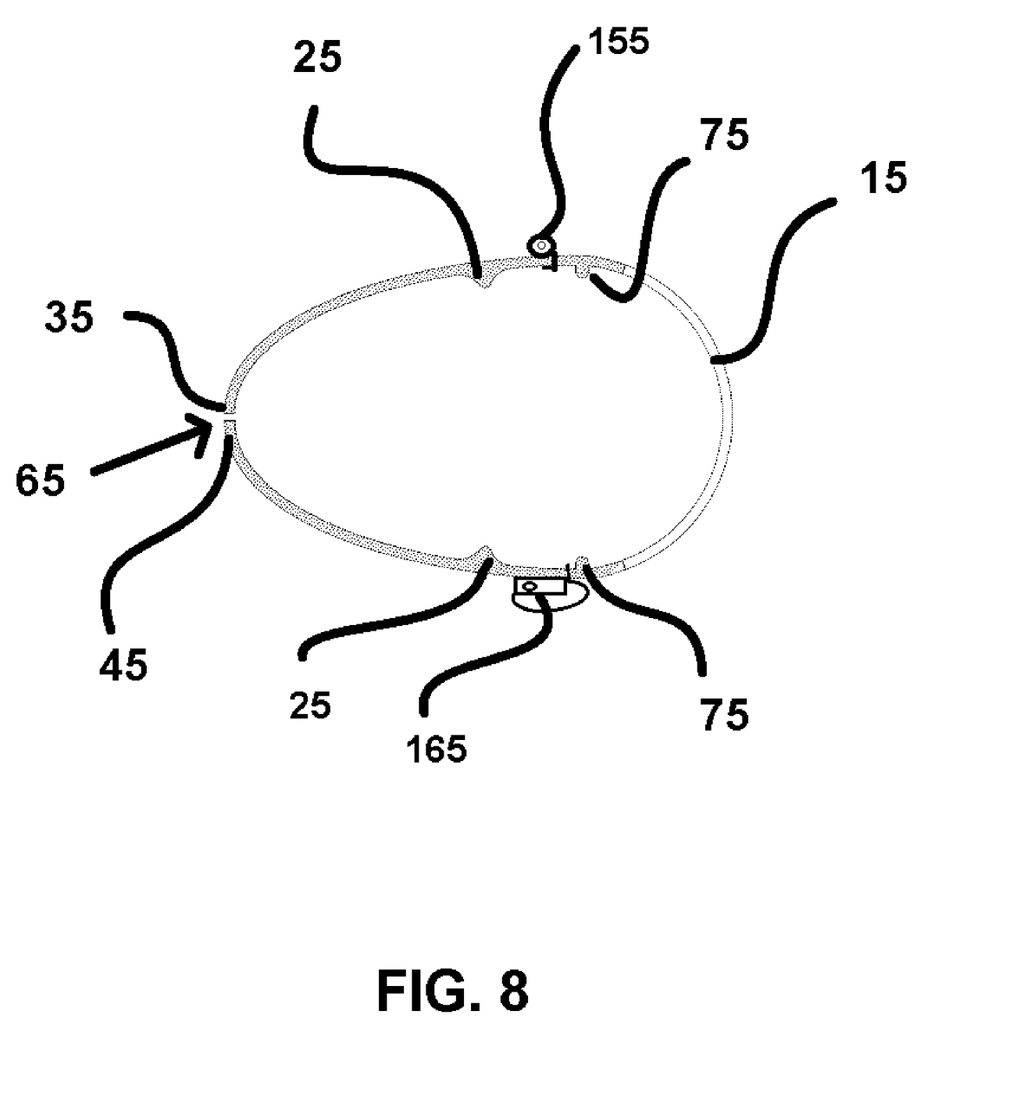
FIG. 8 depicts an alternate embodiment of the present invention having a hinge and latch system for connecting the cover flap portion to the rear cover portion of the apparatus.

Alternate embodiments of the present invention are detailed in FIG. 6 and FIG. 8. While preferred embodiments of the present invention exhibit a uni-body (single piece design) as disclosed in FIG. 3, FIG. 5, and FIG. 7, some alternate embodiments include variations of this design. For example, the embodiment displayed in FIG. 6 exhibits an alternate embodiment of the present invention having a flat front cover portion (15) rather than rounded, but still exhibits a uni-body design. In this embodiment, the notches (75) are also used to keep the present invention in place against the face of the light bar, while leaving room for a small gap between the face and the stationary front cover portion (15). In contrast, the embodiment shown in FIG. 8 has two pieces, with the stationary front cover portion (15) being removably attached to the rear cover portion (20). In such alternate embodiments, the front cover portion (15) connects to the rear cover portion (20). As depicted in FIG. 9, via a hinge (155) and a latch (165) may be used to secure the cover flap portion (10) to the rear cover portion (20).

Similar to the alternate embodiment depicted in FIG. 7, FIG. 8 has a two-piece design which employs a hinge (115) and clasp (125) rather than hooks (105) to secure the front cover portion (15) to the rear cover portion (20). This embodiment is not preferred due to its complexity, however it is easier to remove if needed.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An aerodynamic cover apparatus for the front, top, rear, and bottom of a horizontal LED light bar for motor vehicles comprising:
   a rear cover portion, wherein said rear cover portion has a top flap and a bottom flap;
   wherein said top flap and said bottom flap are not in contact;
   a front cover portion, said front cover portion disposed across the front of the horizontal LED light bar;
   wherein said rear cover portion is in fixed communication with said front cover portion;
   wherein said front cover portion is stationary;
   wherein said front cover portion is translucent;
   wherein said front cover portion is configured to cover the front of the horizontal LED light bar;
   wherein said front cover portion has a rounded, aerodynamic shape; and
   wherein said top flap and said bottom flap are curved such that they approach one another at the rear of the horizontal LED light bar.

2. The apparatus of claim 1, wherein said front cover portion and said rear cover portion encompass the entirety of the horizontal LED light bar.

3. The apparatus of claim 1, wherein said front cover portion is composed of a polycarbonate plastic; and wherein said rear cover portion is composed of a polycarbonate plastic capable of bending to extend around the front of the horizontal LED light bar to the rear of the horizontal LED light bar without breaking, maintaining its aerodynamic shape after installation.

4. The apparatus of claim 1, further comprising:

a film;

wherein said film is disposed behind said front cover portion;

wherein said film is tinted;

notches, said notches disposed at a top and a bottom of said front cover portion; and wherein said notches maintain said film in a stationary position.

5. The apparatus of claim 4, wherein said film is colored.

6. The apparatus of claim 4, wherein said film is equipped with translucent text.

7. The apparatus of claim 4, wherein said film is equipped with a logo.

8. The apparatus of claim 4, wherein said front cover portion and said rear cover portion exhibit a neutral airfoil design.

\* \* \* \* \*